United States Patent [19]

James

[11] Patent Number: 5,721,004
[45] Date of Patent: Feb. 24, 1998

[54] METHOD FOR PRODUCING FAT-FREE AND LOW-FAT VISCOUS DRESSINGS USING INULIN

[75] Inventor: Sherianne M. James, Waukegan, Ill.

[73] Assignee: Kraft Foods, Inc., Northfield, Ill.

[21] Appl. No.: 807,666

[22] Filed: Feb. 27, 1997

Related U.S. Application Data

[60] Provisional application No. 60/013,219, Mar. 1, 1996.
[51] Int. Cl.$^6$ .................................................. A23L 1/05
[52] U.S. Cl. .................................... 426/573; 426/578
[58] Field of Search ............................... 426/573, 578, 426/605, 613, 602

[56] References Cited

U.S. PATENT DOCUMENTS

| | | | |
|---|---|---|---|
| 3,800,036 | 3/1974 | Gabby et al. | 426/164 |
| 4,564,525 | 1/1986 | Mitchell et al. | 426/104 |
| 4,681,771 | 7/1987 | Adachi | 426/658 |
| 4,724,136 | 2/1988 | Scheibl | 424/50 |
| 4,758,515 | 7/1988 | Barwald . | |
| 4,762,726 | 8/1988 | Soucie . | |
| 4,954,621 | 9/1990 | Masaoka et al. | 536/124 |
| 5,087,471 | 2/1992 | Combes | 426/605 |
| 5,104,674 | 4/1992 | Chen . | |
| 5,127,956 | 7/1992 | Hansen et al. | 127/42 |
| 5,169,671 | 12/1992 | Harda | 426/658 |
| 5,209,942 | 5/1993 | Bauer | 426/605 |
| 5,238,698 | 8/1993 | Zumbe et al. | 426/572 |
| 5,254,174 | 10/1993 | Hansen et al. | 127/53 |
| 5,266,348 | 11/1993 | Zumbe et al. | 426/660 |
| 5,268,510 | 12/1993 | Bauer | 426/573 |
| 5,273,772 | 12/1993 | Cooper | 426/611 |
| 5,294,455 | 3/1994 | O'Brien et al. | 426/573 |
| 5,324,531 | 6/1994 | Hoefler | 426/605 |
| 5,429,830 | 7/1995 | Janovsky . | |
| 5,468,512 | 11/1995 | Verschuren | 426/658 |
| 5,501,869 | 3/1996 | Bulega | 426/658 |
| 5,527,556 | 6/1996 | Frippeat | 426/573 |
| 5,569,483 | 10/1996 | Timonen . | |
| 5,614,243 | 3/1997 | Dunn | 426/605 |
| 5,626,901 | 5/1997 | Ambjerg Pederson | 426/573 |

FOREIGN PATENT DOCUMENTS 9 664 299 A1  7/1995  European Pat. Off. .

*Primary Examiner*—Carolyn Paden
*Attorney, Agent, or Firm*—Fitch, Even, Tabin & Flannery

[57] ABSTRACT

Methods for preparing low-fat and/or fat-free viscous dressings, especially low-fat and/or fat-free mayonnaise products, containing inulin as a fat mimetic are provided. These low-fat and/or fat free viscous dressings generally have excellent organoleptic properties and shelf-stability. The low-fat and/or fat-free viscous dressings are prepared from aqueous xanthan solutions, non-creamy and non-gelled inulin solutions or slurries, and aqueous cooked starch solutions. The aqueous xanthan solution (and sometimes the inulin solution) is exposed to high shear to form a non-gelled premix. The non-gelled premix is then mixed with either (1) the aqueous cooked starch solution (if the inulin is contained in the premix) or (2) the aqueous cooked starch solution and the aqueous non-gelled inulin solution or slurry (if the inulin is not contained in the premix). The mixing with the premix is generally under low shear conditions. The so-produced viscous dressing reaches the desired texture in 3 to 12 days.

18 Claims, 1 Drawing Sheet

METHOD FOR PRODUCING FAT-FREE AND LOW-FAT VISCOUS DRESSINGS USING INULIN

RELATED APPLICATION

This application is based on, and claims benefit of, U.S. Provisional application Ser. No. 60/013,219, filed Mar. 1, 1996.

FIELD OF THE INVENTION

The present invention generally relates to the production of a fat-free and/or low-fat viscous dressing. More specifically, this present invention relates to the production of low-fat and/or fat-free viscous dressings using inulin as a fat mimetic. This invention is especially suited for the production of low-fat and/or fat-free mayonnaise using inulin as a fat mimetic.

BACKGROUND OF THE INVENTION

In recent years considerable attention has been directed to the provision of various food products having reduced fat and caloric content. For example, various sucrose fatty acid polyesters have been proposed as fat mimetics. Such sucrose fatty acid polyesters are not naturally-occurring in human diets and have not been generally approved for use in food compositions. It would be desirable, therefore, to provide fat mimetics which are naturally-occurring in foods already included in the human diet. Inulin, which is found in various plant tubers, such as dahlia, jerusalem artichokes, and chicory, is a naturally-occurring fat mimetic.

Unfortunately, it has been difficult to incorporate inulin directed into common foodstuffs while maintaining the desired textural, sensory, and/or organoleptic properties of the foodstuff. The inability to incorporate inulin directly into foodstuffs is at least partially due to its limited water solubility. Incorporation of high levels of inulin directly into foodstuffs often results in a sandy or gritty texture.

Patent Publication WO 93/06744 A1 (assigned to Tirlemontoise Refinery, Ltd. of Brussels, Belgium) attempted to provide an inulin-containing cream composition which could be added to foodstuffs without causing such a sandy texture. The process of Patent Publication WO 93/06744 A1 (i.e., Rafticreming®) generally involves mixing inulin in a liquid (e.g., water) and then subjecting the mixture to significant shear forces to produce a stable, cream composition. The inulin-containing cream composition can then be added directly to food compositions. This Patent Publication also notes, without providing further details, that the cream composition can be formed in situ if the concentration of inulin is "high enough to produce a cream" when the food composition is exposed to high shear. Of course, exposures of the final food composition to such high levels of shear may destroy or adversely affect the desired textural and/or organoleptic characteristics of the foodstuff.

Solutions or suspensions of food hydrocolloids (such as, for example, gums, starches, modified starches, and modified cellulose) have also been used to prepare low-fat viscous dressings. Such foods hydrocolloid-containing viscous dressings generally have less than optimal organoleptic properties. Specifically, such viscous dressings tend to be mouth drying and dull in appearance with a medicinal aftertaste.

It would be desirable, therefore, to provide a method of making a low-fat and/or fat-free viscous dressing with good organoleptic properties using inulin as a fat mimetic. It would also be desirable to provide a method by which inulin in a non-cream formulation can be incorporated in a viscous dressing to produce a low-fat and/or fat-free viscous dressing with good organoleptic properties. The present invention provides such methods.

SUMMARY OF THE INVENTION

Figure 1:
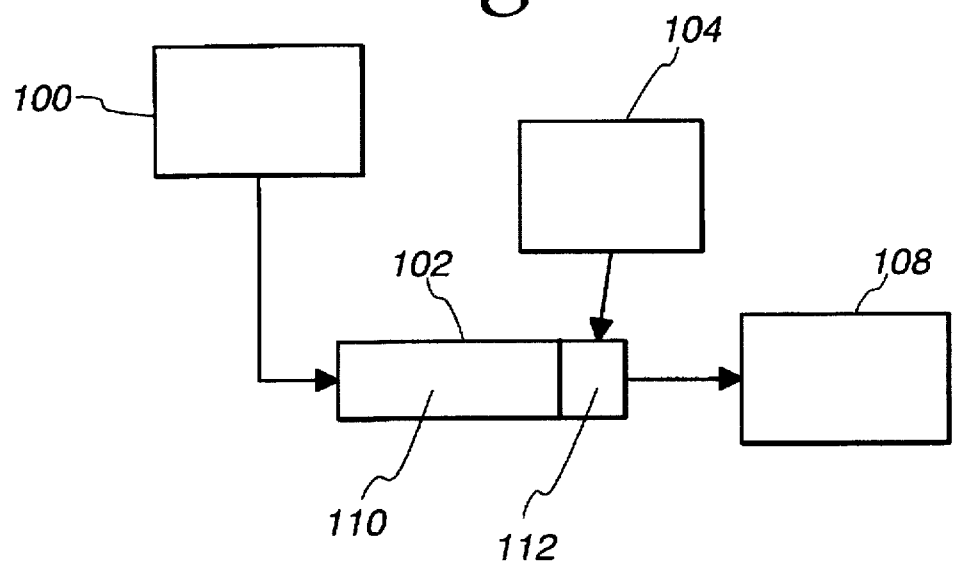
FIG. 1 is a process flow diagram illustrating an embodiment of the invention wherein the inulin is incorporated into an aqueous premix.

This invention generally relates to the production of low-fat and/or fat-free inulin-containing viscous dressings, especially low-fat and/or fat-free inulin-containing mayonnaise products, with excellent organoleptic properties and shelf-stability. More specifically, this invention relates to methods of producing low-fat and/or fat-free viscous dressings containing inulin prepared from non-creamy forms of inulin. These low-fat and/or fat free viscous dressings generally have excellent organoleptic properties and shelf-stability. For purposes of this specification, the terms "low-fat" and "fat-free" are generally used interchangeably and only differ in the relative amounts of fat contained in the final product. Generally, a low-fat viscous dressing product contains less than about 3 grams of fat per tablespoon serving size (about 14–16 grams) and a fat-free product contains less than about 0.5 grams of fat per tablespoon. For purposes of this invention, "low-fat" is also intended to include "fat-free."

The low-fat products of this invention generally contain from about 2 to 20 weight percent inulin and about 2 to 7 weight percent starch in the final product. Generally, the low-fat products of this invention can be prepared by either of two generally related embodiments. In the first embodiment, a mixture of inulin powder, a gum such as xanthan and water is subjected to relatively high shear conditions for a relatively short period of time in order to form a homogeneous, non-creamy, non-gelled premix. Generally conventional spices such as sugars and other adjunct ingredients are incorporated into the premix either before or after the high shear mixing. It is important that this premix is a non-creamy and non-gelled mixture. The resulting premix is then combined with an aqueous cooked starch slurry base and then mixed, preferably under moderate conditions, to form a homogeneous-appearing low-fat viscous dressing. The low-fat viscous dressing generally reaches at least 30 percent, and preferably at least 40 percent, of final texture within 24 hours, reaches the final texture in about 3 to 12 days, and maintains the final texture for at least 3 months.

In the second embodiment, the inulin is not subjected to the high shear mixing. The xanthan and water and other ingredients are mixed and subjected to high shear to form a non-creamy non-gelled premix. An aqueous non-gelled inulin slurry and an aqueous cooked starch slurry are then mixed into the non-gelled premix under moderate shear conditions until a homogenous-appearing low-fat viscous dressing is obtained. The resulting low-fat viscous dressing generally contains about 2 to 20 weight percent inulin and about 2 to 7 weight percent starch. The low-fat viscous dressing generally reaches at least 30 percent, preferably at least 40 percent, of final texture within 24 hours, reaches the final texture in about 3 to 12 days, and maintains the final texture for at least 3 months.

In both the first and second embodiments, it is important that the inulin has not set up or gelled, or begun to set up or gel, at the time the viscous dressing is initially prepared. The inulin is not added as a cream or creamy gel as described in Patent Publication WO 93/06744 A1. Rather, it must be added as an aqueous slurry or solution. The viscosity or texture of the resulting viscous dressing increases as a function of time after its preparation. Only after 3 to 12 days is the final viscosity or texture achieved. Only about 3 percent or higher of the final viscosity or texture is reached within 24 hours.

One object of the present invention is to provide a method for producing a low-fat viscous dressing, said method comprising:

(1) mixing inulin, xanthan, and water;

(2) subjecting the mixture to high shear to form a homogeneous non-creamy, non-gelled premix; and (3) mixing an aqueous cooked starch slurry into the non-gelled premix until a homogeneous-appearing low-fat viscous dressing is obtained;

wherein the low-fat viscous dressing contains about 2 to 20 weight percent inulin and about 2 to 7 weight percent starch and wherein the low-fat viscous dressing reaches at least 30 percent of final texture within 24 hours, reaches the final texture in about 3 to 12 days, and maintains the final texture for at least 3 months.

Another object of the present invention is to provide a method for producing a low-fat viscous dressing, said method comprising:

(1) mixing xanthan and water to form a homogenous, non-gelled premix;

(2) treating the homogenous, non-gelled premix with high shear to form a non-gelled mixture;

(3) separately mixing an aqueous non-gelled inulin slurry and an aqueous cooked starch slurry into the non-gelled mixture until a homogenous-appearing low-fat viscous dressing is obtained;

wherein the low-fat viscous dressing contains about 2 to 20 weight percent inulin and about 2 to 7 weight percent starch and wherein the low-fat viscous dressing reaches at least 30 percent of final texture within 24 hours, reaches the final texture in about 3 to 12 days, and maintains the final texture for at least 3 months.

These as well as other objects and advantages of the present invention will be apparent from a consideration of the present specification.

DESCRIPTION OF THE PREFERRED EMBODIMENTS

The present invention relates to methods for producing low-fat viscous dressings, especially fat-free mayonnaise, containing inulin as a fat mimetic. The inulin is introduced into the viscous dressing as an aqueous, non-gelled solution or slurry (i.e., as a non-creamy formulation). The aqueous inulin solution or slurry should not have begun to set up or gel prior to its addition to the viscous dressing formulation. This method avoids the use of a separate aqueous creamy inulin formulation. In the present methods, the inulin only begins to set up or gel after the various components have been mixed (i.e., after formation of the viscous dressing).

Inulin is used as a fat mimetic in the present invention. Inulin is a polysaccharide or mixture of polysaccharides containing $\beta$-1,2 bonded glucofructan polymers of varying molecular weights terminated at the reducing end by a glucose. Thus, inulin is a series of repeating five member fructose rings terminated by a six member glucose ring. Inulin is often represented by $GF_n$ where G is a glucose ring, F is a fructose ring, and n is the number of fructose rings. Inulin is often derived from various plant tubers, such as dahlia, jerusalem artichokes, and chicory. The number of fructose rings (i.e., the n value) generally varies between 2 to 15 in extracted inulin from plant sources. The average value of n is generally in the range of about 8 to about 13 and is dependent on the extraction processing conditions. Generally inulin of general formula $GF_n$ are non-digestible for n values greater than two.

Preferably the inulin used in the present invention has an average n value of about 8 to 12 and has a number average molecular weight of about 1300 to 1900. Preferably the inulin used in the present invention contains about 70 weight percent $GF_n$ where n is greater than or equal to six. Preferably the inulin used in the present invention is prepared by water extraction of chicory under relatively mild conditions in accordance with known practices. Inulin is commercially available under the tradename Fibruline and Raftiline.

Figure 2:
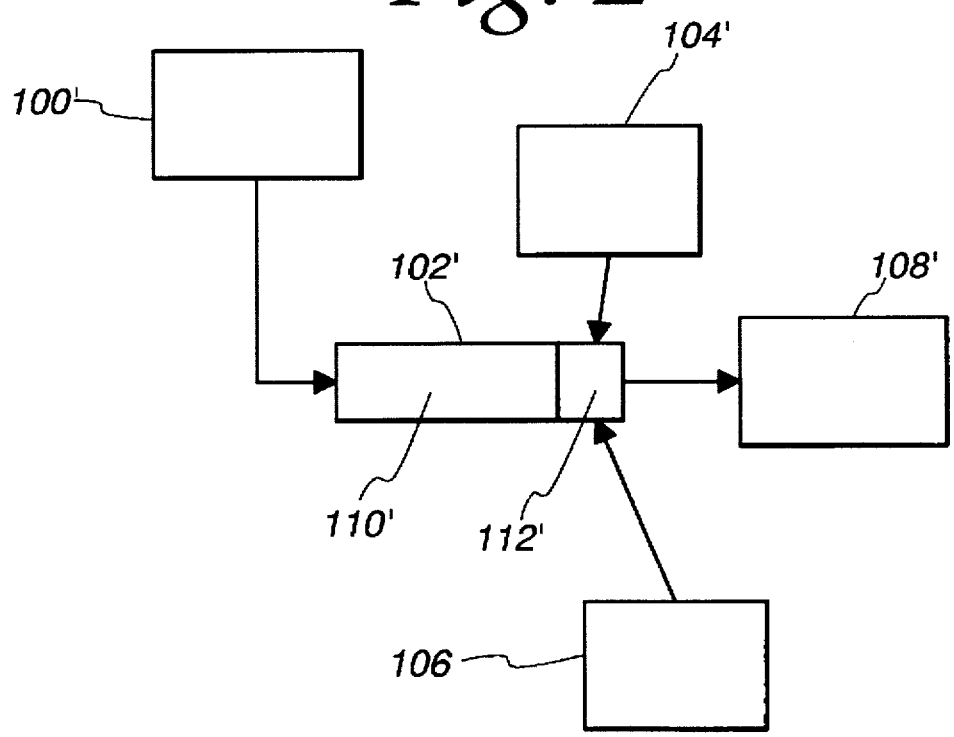
FIG. 2 is a process flow diagram illustrating another embodiment of the invention wherein the inulin and the starch are separately incorporated into a non-gelled aqueous xanthan mixture.

The two major embodiments of the present invention are illustrated in FIGS. 1 and 2. For the embodiment shown in FIG. 1, inulin, xanthan, and water (along with optional adjunct ingredients including, for example, acids, spices, preservatives, colorants, emulsion concentrate (i.e., egg, oil), and sweeteners) are mixed in a mixing zone or tank 100 to form a homogeneous mixture. Normally the mixture will contain about 0 to 3 weight percent xanthan and about 3 to 35 weight percent inulin. The premix can be stored in holding tank (not shown) or transferred directly to a high shear zone or mixer 110 where high shear is applied to form a homogeneous, non-creamy, non-gelled premix. The non-gelled mixture can be stored in a holding tank (not shown) or transferred directed to a moderate shearing zone 112 before gelling occurs.

An aqueous cooked starch base (normally a starch slurry containing about 14 to 15 weight percent starch) from starch cooker 104 is mixed with the non-gelled premix from the mixing zone 110 in the high shear mixing zone 112 to form a homogeneous-appearing low-fat viscous dressing 70. Generally the homogeneous nature of the low-fat viscous dressing is indicated by the absence of starch streaking in the viscous dressing product. The resulting viscous dressing from mixer 112 can then directed to an appropriate holding tank 108 or to filing equipment (not shown).

FIG. 2 illustrates an embodiment of the present invention where both the inulin and starch are added after high shear mixing. In this embodiment, inulin is not subjected to high shear conditions as in the process illustrated in FIG. 1. In FIG. 2, water and xanthan (along with optional ingredients such as preservatives, colorants, emulsifier concentrate (i.e., egg, oil), sweeteners, spices, and the like) are mixed together in mixer 100'. This mixture which generally contains about 0 to 2.6 weight percent xanthan is subjected to high shear mixing in high shear mixing zone 110' under high shear conditions to form a homogeneous, non-creamy, non-gelled premix. As shown in FIGS. 1 and 2, mixer 102' has a high shear mixing zone 110' and a moderate shear mixing zone 112'. The premix exiting the high shear zone 110' is mixed with a separately prepared aqueous cooked starch base from starch cooker 104' and a separately prepared aqueous non-gelled inulin solution or slurry (normally containing about 6 to 35 weight percent inulin) from mixer 106. The combining of the premix, cooked starch and inulin slurry takes place within the moderate shear mixing zone 112' of mixer 102'. Thus, the cooked starch and inulin solutions are not exposed to high shear in high shear mixing zone 110'. Mixing continues in the moderate shear zone 112' until a homogenous-appearing (i.e., no visible starch streaking) low-fat viscous dressing is obtained. For a viscous dressing containing 20% inulin, 0% xanthan and 2% starch, the ratio of inulin slurry to premix to cooked starch base is 57.2:23.22:19.78. For a dressing containing 2% inulin, 0.8% xanthan and 7% starch, the ratio is 5.7:50.9:43.4. The homogenous-appearing low-fat viscous dressing is delivered to tank 108' for storing or is delivered directly to a filling operation (not shown).

Of course, modifications can be made in the process illustrated in FIG. 2. For example, various holding tanks (similar to those in FIG. 1) could be used. In addition, the high shear zone 110 and the moderate shear zone 112 of mixer 102 could be contained in separate mixer units. In addition, an in-line mixer could be placed in the line leading from moderate shear zone 112 to tank 108 to better insure production of a homogeneous product.

The homogenous-appearing low-fat viscous dressings from units 70 (FIG. 1) and 108 (FIG. 2) initially are relatively low viscosity materials. With time, however, the viscosity, texture, and firmness of the viscous dressings increase as shown in FIG. 3. The low-fat viscous dressing reaches at least 30 percent, and preferably at least 40 percent, of final texture within 24 hours and generally reaches its final texture in about 3 to 12 days. Generally the final texture of the viscous dressing is about 180 to 570 Pa yield stress. A final texture of at least 180 Pa is necessary for an acceptable viscous dressing product. The viscous dressing is shelf stable and maintains its final texture for at least 3 months.

Of course, the two embodiments can be effectively combined, if desired, whereby a portion of the inulin is included in the premix (and thereby subjected to high shear conditions) and the remaining amount of inulin is added as a separate aqueous solution or slurry along with the cooked starch solution. Such a combined process would, however, involve extra processing steps.

The low-fat viscous dressing of the present invention contains xanthan, inulin, cooked starch, and water as the main ingredients. Generally, the low-fat viscous dressing contains about 0 to 0.8 weight percent xanthan, about 2 to 20 weight percent inulin, about 2 to 7 weight percent starch, and about 52 to 75 weight percent water. Other convention viscous dressing ingredients are preferably included in the present low-fat viscous dressings. Such conventional adjunct ingredients include salt (generally about 0 to 3 weight percent), sweeteners (natural or artificial; generally about 0 to 4 weight percent), vinegar (generally about 0 to 8 weight percent), emulsion concentrate (e.g., egg and oil; generally about 0 to 4 weight percent), lactic acid (generally about 0 to 1 weight percent), and spices (generally about 0 to 0.2 weight percent). Preferably the optional ingredients are incorporated into the aqueous xanthan mixture so they are subjected to high shear mixing. The optional ingredients can be added after the high-shear mixing step, if desired, so long as they are uniformly distributed in the viscous dressing composition.

Starches suitable for use in the present invention include, for example, granular starches such as deflavored waxy maize starch (National Starch "National 377"), corn starch, rice starch, and tapioca starch. The starch is added as a cooked starch base and is prepared in a conventional manner, i.e., by cooking a starch slurry to a temperature of about 185 to 190° F. followed by cooling to ambient conditions. Generally, the starch solution is at a temperature of about 72° to 90° F. when combined with the premix to form the viscous dressing formulation.

The mixture containing xanthan and water (FIG. 2) or containing xanthan, inulin, and water (FIG. 1) is exposed to high shear mixing in any suitable high shear mixer, for example, colloid mills, Dispax mixers, Rannie, hydroshear mixers, etc. Exposure to high shear conditions is for only a relatively short time to disperse and hydrate the hydrocolloids prior to combining with the starch base to form the final dressing formulation. For purposes of this invention, the time of high shear mixing is sufficiently short to prevent setting up or gelling of the resulting mixture but is sufficiently long to insure formation of a homogeneous mixture. Normally, high speed shearing is carried out for less than about one minute, although longer time periods can be used so long as a homogenous, non-gelled mixture is obtained. The magnitude of the shear applied during the high shear mixing must be sufficient for the resulting viscous dressing to obtain at least 30 percent, and preferably at least 40 percent, of a final texture or firmness within about 24 hours and the final texture or firmness within 3 to 12 days. An acceptable final texture is at least 250 Pa yield stress. Preferably the final texture is in the range of about 300 to 500 Pa.

It has been found that unless high shear mixing is used in forming the premix, the resulting viscous dressing product will not achieve the desired yield stress upon aging, i.e., within 3 to 12 days. In forming the premix, the shear should be at least about 8000 sec$^{-1}$, and preferably between about 8000 and about 18,000 sec$^{-1}$.

EXAMPLE 1

31.3 pounds of water, 2.2 pounds of 42 DE corn syrup and 4.3 pounds of adjuncts (preservatives, acid, flavor, color, etc.) were introduced into a mix tank and fitted with an impeller type mixer operated at 1100 rpm. 9.3 pounds of inulin powder were slowly added to the tank and mixed for 3 minutes to insure complete mixing. 2.3 pounds of a dry blended xanthan salt mixture (0.15 pounds of xanthan and 1.8 pounds of salt) was then added and mixed for an additional 3 minutes.

The mixture was then subjected to high shear mixing in a colloid mill at a flow rate of 10.8 pounds per minute. The shear was $3 \times 10^5$ sec$^{-1}$. The resulting product was a homogeneous non-creamy, non-gelled premix.

A cooked starch base was prepared by introducing 39.8 pounds of water, 4.0 pounds of National 377 brand starch, 4.4 pounds of sugar and 1.9 pounds of vinegar into a Groen kettle. The mixture was heated to a temperature of 189.5° F. over 10 minutes and then cooled to 90° F. over 10 minutes to provide the cooked starch base.

The premix, at a flow rate of 10.8 pounds per minute, and cooked starch base, at a flow rate of 9.2 pounds per minute were introduced into a Groen kettle and mixed at 200 rpm for 5 minutes. The resulting product, which was a homogeneous emulsion and had no visible starch streaking, contained 10% inulin, 3.7% starch, 0.55% xanthan gum and reached a final 400 Pa yield stress in about one week.

The various features of the invention which are believed to be new are set forth in the following claims.

What is claimed is:

1. A method for producing a low-fat viscous dressing, said method comprising:

(1) subjecting a mixture of inulin, gum and water to high shear to form a homogeneous, non-creamy, non-gelled premix;

(2) mixing an aqueous cooked starch slurry into said non-gelled mixture under moderate shear until a homogeneous-appearing low-fat viscous dressing is obtained;

wherein the low-fat viscous dressing contains about 2 to 20 weight percent inulin and about 2 to 7 weight percent starch and wherein the low-fat viscous dressing reaches a final 180 to 570 PA yield stress in about 3 to 12 days.

2. A method as defined in claim 1 wherein the dressing reaches the final texture in about 3 to 12 days, and maintains the final texture for at least 3 months.

3. A method as defined in claim 1 wherein the homogeneous, non-creamy, non-gelled premix contains about 3 to 35 weight percent inulin and about 0 to 3 weight percent xanthan.

4. A method as defined in claim 1 wherein the aqueous cooked starch slurry contains about 14 to 15 weight percent starch.

5. A method as defined in claim 1 wherein the homogeneous, non-creamy, non-gelled premix contains about 3 to 35 weight percent inulin and about 0 to 3 weight percent xanthan and wherein the aqueous cooked starch slurry contains about 14 to 15 weight percent starch.

6. A method as defined in claim 1 wherein the inulin is of the general formula $GF_n$ where G represents a glucose ring, F represents a fructose ring, and n has an average value of about 8 to 12 and wherein the inulin has a number average molecular weight of about 1300 to about 1900.

7. A method as defined in claim 1 wherein the high shear is step (1) is at least 8000 $sec^{-1}$.

8. A method as defined in claim 7 wherein the high shear in step (1) is in the range of about 8000 $sec^{-1}$ to about 18,000 $sec^{-1}$.

9. A method for producing a low-fat viscous dressing, said method comprising:

(1) subjecting an aqueous mixture of xanthan and water to high shear to form a homogeneous, non-creamy, non-gelled premix;

(2) separately mixing an aqueous non-gelled inulin slurry and an aqueous cooked starch slurry with said non-gelled mixture under conditions of moderate shear until a homogenous-appearing low-fat viscous dressing is obtained;

wherein the low-fat viscous dressing contains about 2 to 20 weight percent inulin and about 2 to 7 weight percent starch and wherein the low-fat viscous dressing reaches a final 180 to 570 PA yield stress in about 3 to 12 days.

10. A method as defined in claim 9 wherein the dressing reaches the final texture in about 3 to 12 days, and maintains the final texture for at least 3 months.

11. A method as defined in claim 9 wherein the homogeneous, non-creamy, non-gelled premix contains about 0 to 2.6 weight percent xanthan.

12. A method as defined in claim 11 wherein the aqueous cooked starch slurry contains about 14 to 15 weight percent starch and is at a temperature of about 72° to 90° F.

13. A method as defined in claim 9 wherein the aqueous cooked starch slurry contains about 14 to 15 weight percent starch and is at a temperature of about 72° to 90° F.

14. A method as defined in claim 9 wherein the inulin is of the general formula $GF_n$ where G represents a glucose ring, F represents a fructose ring, and n has an average value of about 8 to 12 and wherein the inulin has a number average molecular weight of about 1300 to about 1900.

15. A method as defined in claim 14 wherein the high shear is step (1) is at least 8000 $sec^{-1}$.

16. A method as defined in claim 15 wherein the high shear in step (1) is in the range of about 8000 $sec^{-1}$ to about 18,000 $sec^{-1}$.

17. A method as defined in claim 9 wherein the high shear is step (1) is at least 8000 $sec^{-1}$.

18. A method as defined in claim 15 wherein the high shear in step (1) is in the range of about 8000 $sec^{-1}$ to about 18,000 $sec^{-1}$.

* * * * *